United States Patent
Chang et al.

(10) Patent No.: US 11,310,443 B2
(45) Date of Patent: Apr. 19, 2022

(54) VIDEO PROCESSING METHOD, APPARATUS AND STORAGE MEDIUM

(71) Applicant: BEIJING XIAOMI PINECONE ELECTRONICS CO., LTD., Beijing (CN)

(72) Inventors: Binglin Chang, Beijing (CN); Kailun Ma, Beijing (CN); Zhenghui Shi, Beijing (CN); Qingmin Wang, Beijing (CN)

(73) Assignee: Beijing Xiaomi Pinecone Electronics Co., Ltd., Beijing (CN)

( * ) Notice: Subject to any disclaimer, the term of this patent is extended or adjusted under 35 U.S.C. 154(b) by 0 days.

(21) Appl. No.: 17/244,703

(22) Filed: Apr. 29, 2021

(65) Prior Publication Data
US 2022/0038641 A1 Feb. 3, 2022

(30) Foreign Application Priority Data
Jul. 28, 2020 (CN) .......................... 202010736003.7

(51) Int. Cl.
| | |
|---|---|
| *H04N 5/265* | (2006.01) |
| *G11B 27/036* | (2006.01) |
| *H04N 5/91* | (2006.01) |
| *G06T 7/30* | (2017.01) |
| *G06T 7/70* | (2017.01) |
| *H04N 5/272* | (2006.01) |

(52) U.S. Cl.
CPC .............. *H04N 5/265* (2013.01); *G06T 7/30* (2017.01); *G06T 7/70* (2017.01); *G11B 27/036* (2013.01); *H04N 5/272* (2013.01); *H04N 5/91* (2013.01); *G06T 2207/10016* (2013.01); *G06T 2207/20221* (2013.01)

(58) Field of Classification Search
None
See application file for complete search history.

(56) References Cited

U.S. PATENT DOCUMENTS

| | | | |
|---|---|---|---|
| 2012/0057051 A1* | 3/2012 | Ito ...................... | H04N 5/23245 348/239 |
| 2014/0104314 A1* | 4/2014 | David .............. | G08B 13/19684 345/632 |
| 2017/0040036 A1 | 2/2017 | Ryu et al. | |
| (Continued) | | | |

FOREIGN PATENT DOCUMENTS

CN 109618218 A 4/2019

OTHER PUBLICATIONS

Extended European Search Report in the European Application No. 21171101.5, dated Oct. 29, 2021, (8p).

(Continued)

*Primary Examiner* — Eileen M Adams
(74) *Attorney, Agent, or Firm* — Arch & Lake LLP

(57) ABSTRACT

The present disclosure relates to a video processing method and apparatus, and a storage medium. The method is applied to a terminal and includes: a background frame for a time static special effect is determined from video frames in a video to be processed; for each of the video frames in the video, an image area, where a target object is located is acquired from the respective video frame and the image area is fused into the background frame to generate a special effect frame with the time static special effect.

15 Claims, 8 Drawing Sheets

(56) References Cited

U.S. PATENT DOCUMENTS

| | | |
|---|---|---|
| 2017/0094192 A1 | 3/2017 | Adsumilli et al. |
| 2017/0094193 A1 | 3/2017 | Adsumilli et al. |
| 2017/0094194 A1 | 3/2017 | Adsumilli et al. |
| 2017/0094195 A1 | 3/2017 | Adsumilli et al. |
| 2017/0094196 A1 | 3/2017 | Adsumilli et al. |
| 2020/0228730 A1 | 7/2020 | Adsumilli et al. |
| 2021/0142540 A1* | 5/2021 | Jeyakar ................. G06N 20/00 |

OTHER PUBLICATIONS

Sony Corporation: "Help Guide:Smile Shutter",2016, XP055821844,Retrieved from the Internet:URL:https://helpguide.sony.net/cam/1630/vl/en/contents TP0000933276.html[retrieved on Jul. 7, 2021], (1p).

\* cited by examiner

VIDEO PROCESSING METHOD, APPARATUS AND STORAGE MEDIUM

CROSS-REFERENCE TO RELATED APPLICATION

This application is based on and claims priority to Chinese Patent Application No. 202010736003.7, filed on Jul. 28, 2020, the entire contents of which are incorporated herein by reference.

BACKGROUND

With the continuous development of multimedia technology, video special effects are often used in film and television works to display colorful and even beyond reality video effects, such as, static special effect, clone special effect, and the like. However, the realization of the video special effects requires professional post-processing and a large number of editing and production with post-production tools which are not unfavorable for the popularization and application of the special effect technology and makes it difficult to preview the special effects directly in a video shooting process. In addition, the production of the video special effects is difficult, and the learning cost is high. Therefore, a higher professional requirement is also required for the post-production personnel.

SUMMARY

The present disclosure relates to multimedia technologies, and particularly, to a video processing method and apparatus, and a storage medium.

According to a first aspect of examples of the present disclosure, a video processing method is provided. The method is applied to a terminal. The method includes the following operations:

a background frame for a static special effect is selected from video frames in a video to be processed; and for each of the video frames in the video, an image area, where a target object is located, is acquired from the respective video frame; and the image area is fused into the background frame to generate a special effect frame with the static special effect.

According to a second aspect of examples of the present disclosure, a video processing apparatus is provided. The apparatus is applied to a terminal. The apparatus includes a processor; and a memory for storing executable instructions capable of running on the processor, wherein the processor is configured to run the executable instructions to: select, from video frames in a video to be processed, a background frame for a static special effect; and for each of the video frames in the video, acquire an image area, where a target object is located, from the respective video frame and fuse the image area into the background frame, to generate a special effect frame with the static special effect.

According to a third aspect of examples of the present disclosure, a non-transitory computer readable storage medium is provided. The computer executable instructions are stored in the computer readable storage medium. The computer executable instructions, when being executed by a processor, cause the processor to implement the operations of any of the above-described video processing methods.

It should be understood that the above general description and the following detailed description are only exemplary and explanatory and not intended to limit the present disclosure.

BRIEF DESCRIPTION OF THE DRAWINGS

The accompanying drawings, which are incorporated in and constitute a part of this specification, illustrate examples consistent with the invention and, together with the description, serve to explain the principles of the invention.

DETAILED DESCRIPTION

Examples will be described in detail herein, examples of which are illustrated in the accompanying drawings. The following description refers to the accompanying drawings in which the same numbers in different drawings represents the same or similar elements unless otherwise represented. The implementations set forth in the following description of examples do not represent all implementations consistent with the present disclosure. Instead, they are merely examples of apparatuses and methods consistent with aspects related to the present disclosure.

Figure 1:
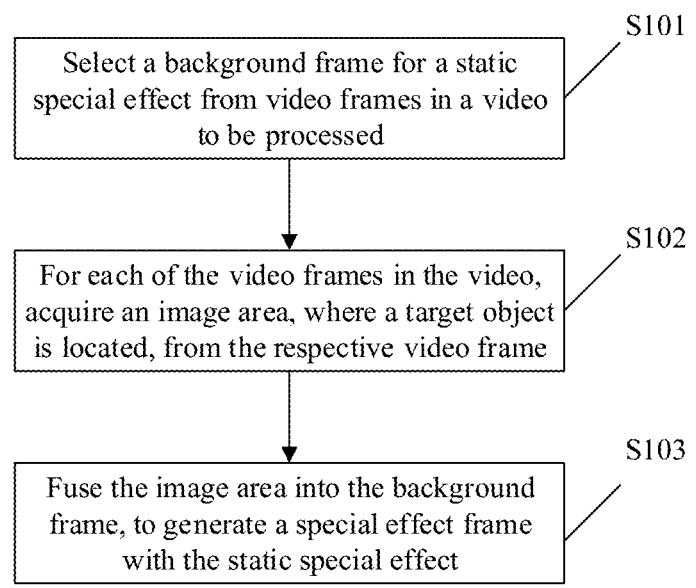
FIG. 1 is a first flowchart of a video processing method according to an example of the present disclosure.

FIG. 1 is a flowchart of a video processing method according to an example of the present disclosure. The method is applied to a terminal. As shown in FIG. 1, the method includes the following operations.

In operation S101, a background frame for a static special effect is selected from video frames in a video to be processed.

In operation S102, for each of the video frames in the video, an image area, where a target object is located, is acquired from the respective video frame.

In operation S103, the image area is fused into the background frame, to generate a special effect frame with the static special effect.

In the examples of the present disclosure, the terminal is an electronic device having a display function. The user may play the video or preview the video content when the video is recorded through the terminal.

The video to be processed may be a complete video that has been recorded, or may be a video that is being recorded. For example, the process of recording a video includes a process of acquiring consecutive multiple video frames, and the recorded video is composed of the above video frames.

Figure 2A:
FIG. 2A is a first schematic diagram of a static special effect picture according to an example of the present disclosure.
Figure 2B:
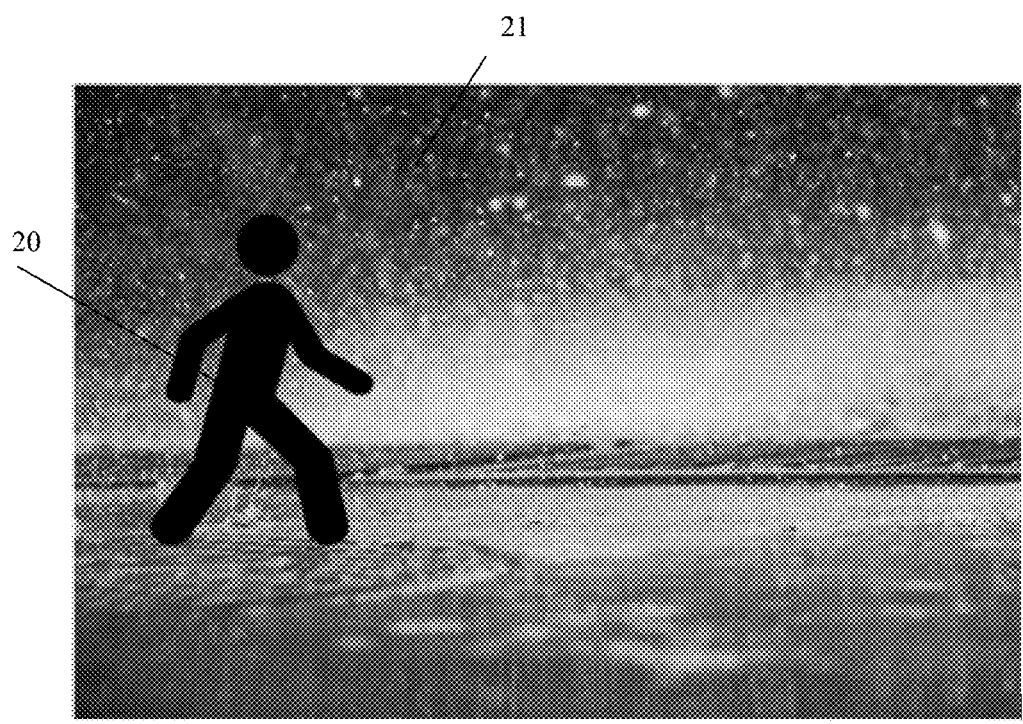
FIG. 2B is a second schematic diagram of a static special effect picture according to an example of the present disclosure.
Figure 2C:
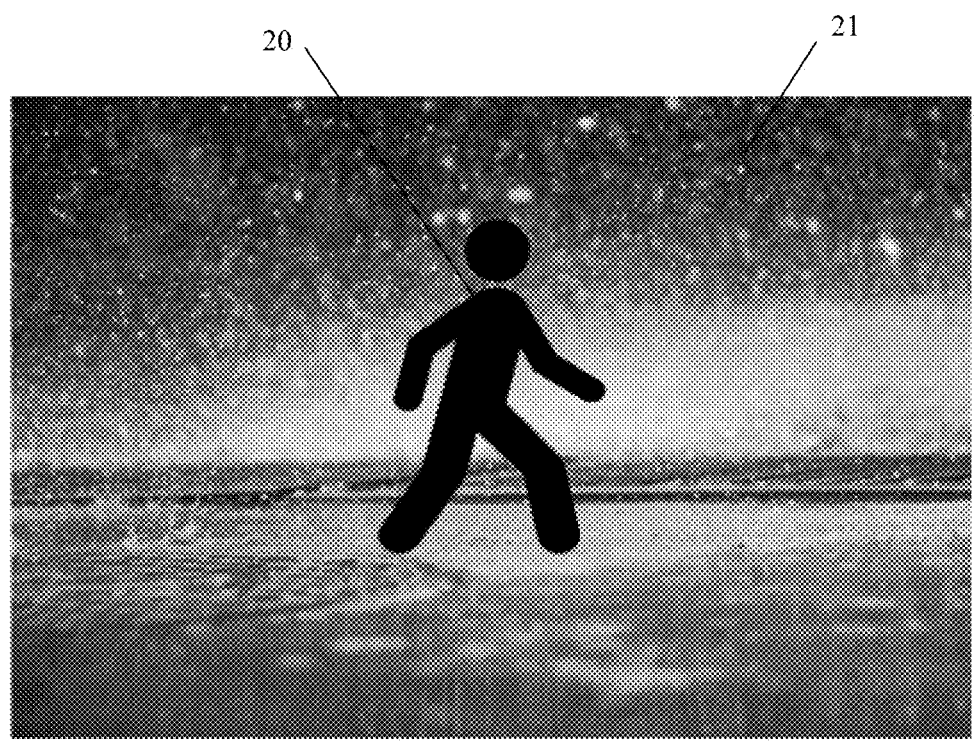
FIG. 2C is a third schematic diagram of a static special effect picture according to an example of the present disclosure.

In the examples of the present disclosure, the static special effect refers to that, during the video playback, after a certain point in time, the background content in the screen stops changing and only the target object in the picture dynamically changes. For example, the dynamic video of the target object is displayed on the screen, and the content displayed in the area outside the image area where the target object is located is always same. As shown in FIG. 2A, FIG. 2B and FIG. 2C, the person in the video screen is the target object 20, and the raining background is the background area 21 outside the image area where the target object is located. During the dynamic playback of the video, FIG. 2A, FIG. 2B and FIG. 2C are displayed at different points in time, respectively, a dynamic effect for the target object 20 is presented in the video, and the background area 21 is always remains stationary. The target object in the video is a walking person and the background is a raining street. After entering the static special effect, the background image stops at the picture displayed at the time when the time static mode is entered, and the target object is still in the walking state. In this way, the visual effect is that the raindrops remain in the air and do not fall, thereby forming an effect of time static relative to the target object.

The above image area where the target object is located may be an image area within the edge of the target object, or may be image area with a fixed shape including the target object, for example, a rectangular area or a circular area.

In an example, the target object may be segmented from the video frame along the edges by the image segmentation technique, and the area surrounded by the outer edges of the target object is used as the above-described image area.

In examples of the present disclosure, in multiple video frames in a video, one frame is determined as the background frame. The background picture of the background frame is used as the background picture after the static special effect is entered. For example, the first frame at the beginning after a static special effect is entered may be used as a background frame, the previous frame of a frame at which the static special effect is entered may be used as a background frame, or any frame after the beginning of the video may be used as the background frame. In an actual application, it may be set according to actual scene requirements.

After the static special effect is entered, the background picture of the background frame is always displayed as the background picture, so that in the subsequent video, various objects in the background picture remain stationary. By fusing the target object in each of the video frames of the video into the background frame, the target object in the video moves according to the time sequence in which the video is shot, while the background picture remains stationary, thereby implementing the time static effect.

According to the above-described methods of the examples of the present disclosure, the image area where the target object is located in each of video frames may be determined by using the target object recognition technique, and then, the image area where the target object is located in each of video frames is sequentially fused with the background frame to generate a time-stationary special effect frame. In this way, a special effect frame may be directly displayed on a screen when the playback or previewing is performed during shooting, to display a result with special effect, thereby facilitating video production on a terminal and improving a viewing experience of a user.

Figure 3:
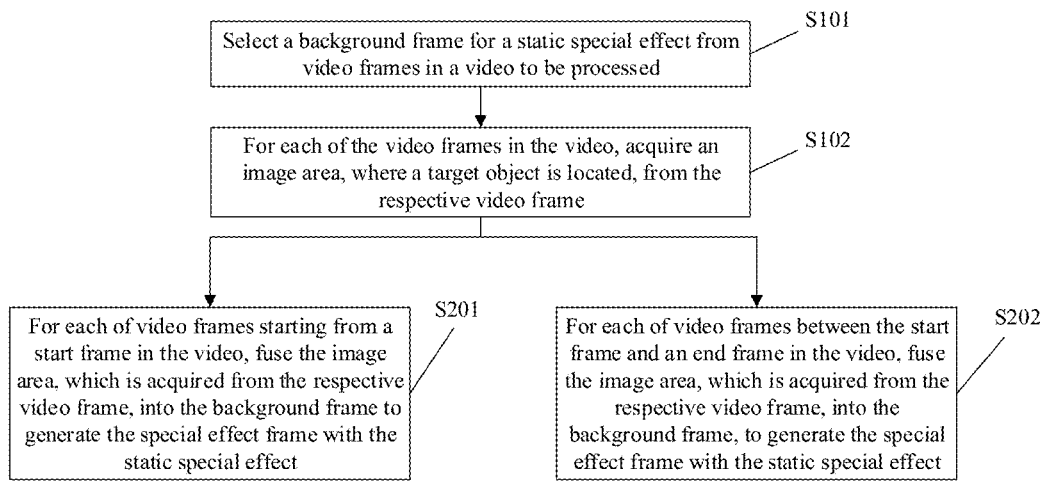
FIG. 3 is a second flowchart of a video processing method according to an example of the present disclosure.

In some examples, as shown in FIG. 3, the operation S103 of fusing the image area into the background frame to generate the special effect frame with the static special effect includes the following operation:

in operation S201, for each of video frames starting from a start frame in the video, the image area, which is acquired from the respective video frame, is fused into the background frame to generate the special effect frame with the static special effect; or in operation S202, for each of video frames between a start frame and an end frame in the video, the image area, which is acquired from the respective video frame, is fused into the background frame, to generate the special effect frame with the static special effect.

A static special effect may be produced at any time point in the video playback process. For example, after the video is normally played for a period of time, it is switched into a special effect frame displaying the static special effect starting from a certain frame. In this way, the viewer can experience the effect of a sudden stop of time.

In the examples of present disclosure, it is also possible to stop the display of the time static special effect for a posture of the target object. That is, a special effect frame displaying time static may be switched back to display the original shot video frame.

Here, the special effect frames may be stored separately, and the separately stored special effect frames may be displayed when the playback reaches the start frame, from which the static special effect is entered. It is also possible to replace the original shot video frame with the special effect frame, so that the special effect frame may be played continuously from the start frame during the playback, thereby switching from the non-special effect to the static special effect during the video playback process.

In some examples, the method further includes the following operations:

the video frames in the video are displayed when being recorded;

if the number of video frames in the predetermined storage space is not exceed a storage amount threshold, the video frames is buffered starting from the start frame.

the image area which is acquired from each of the buffered video frames is fused into the background frame to generate and display the special effect frame.

In examples of the present disclosure, when the static special effect is added during recording, a block of storage space may be reserved for storing each of video frames from the start frame to the end frame to facilitate the processing of the video frames to generate special effect frames. However, during the recording process, when video frames after the start frame are stored in the predetermined storage space, if the predetermined storage space is full but the end frame has not detected, the video frames belonging to the period of the static special effect cannot be stored continuously. Therefore, the generation of the special effect frame may be stopped at this time. From the view of the preview effect, the static special effect is automatically stopped at this time, and the display of the original video frame is restored.

In another example, when the number of video frames stored exceeds threshold of the storage space, the storage space may also be cleared, the subsequent video frames may be stored continuously, and special effect frames may be generated in real time according to the buffered data frames. Here, the original recorded video frame may be directly replaced with the generated special effect frame, and the special effect frame may be directly played during subsequent playback, so that extra storage space is not required. In the video recording process, the storage space for buffering the video frames may be recycled according to the requirements for generating the special effect frames until an instruction to stop generating the special effect frames or a second predetermined posture of the target object is detected.

In this way, it is possible to reduce excessive storage space occupied in the video processing process, and reduce a case in which the terminal performance is affected due to the excessive occupation of the buffer in the video recording time process.

In addition, in the process of recording the video, the shooting parameters may be fixed to reduce the special effect frames distortion caused by automatically adjusting the shooting parameters due to the change of light. The shooting parameters include, but are not limited to, ISO (i.e. Sensitivity), exposure time, focus distance, white balance parameters, and the like.

In some examples, the operation that the background frame for the static special effect is selected from the video frames in the video to be processed includes an operation that a first frame after the video to be processed enters a time static mode in which the static special effect is formed is determined as the background frame for the static special effect.

In the examples of the present disclosure, the first frame after the static special effect mode is entered may be used as the background frame, and subsequent special effect frames are fused on the basis of the background frame. In this way, when the static special effect is entered, various objects in the background picture may be stopped at the moment when the static special effect is started. For example, there is a flying bird in the background picture, if the first frame after the static special effect mode is entered is used as the background frame, the flying bird remains at the position where the bird is located in the first frame. At this time, if the target object is a running person, during the static special effect process, the person remains running and the bird in the background remains in the air, thereby forming a visual effect of sudden time stop.

It should be noted that if the first frame after the time static mode is entered also includes the target object of the main body, during processing, the target object may be removed from the first frame firstly, and only the background part is reserved. The area where the target object is removed may be blurred according to the surrounding environment, or may be fused according to the pictures in several frames before and after the background frame.

In some examples, the operation that the image area is fused into the background frame to generate the special effect frame with the static special effect includes the following operations:

an area at a target position in the background frame is overlaid with the image area; and.

edges of the image area with which the background frame was overlaid are feathered to form the special effect frame.

When the image area is fused, the respective target position in the background frame may be determined based on the position of the image area in the recorded original video frame. The image area where the target object is located is then segmented from the original video frame and overlaid on the target position in the background frame. In this way, the target object in the image area in each frame of the video have the position and posture in the shooting process, and the background picture always remains unchanged as the background picture in the background frame.

Further, in an example, the edges of the image areas are need to be feathered after the overlaying process is performed, so that the edges of the image area are fused with the background frame, so that no obvious "cutout" traces will appear, and the quality of the picture can be improved.

In another example, the edges of the image area and the background frame may be naturally fused by mixing several pixels in the edges range of the overlaid image area with several pixels in the corresponding positions of the background frame according to a certain ratio, that is, by adjusting the pixel value of the image according to the ratio. For example, the mixing ratio of the pixel value of the image area and the pixel value of the corresponding position in the background frame decreases from inside to outside according to the edge of the image region, thereby improving the overall effect of the picture.

In some examples, the operation that the area at the target position in the background frame is overlaid with the image area includes the following operations:

an alignment parameter is determined according to the position of the target object in each of the video frames; and an area at the target position in the background frame is overlaid with the image area of the target object according to the alignment parameter.

In the process of fusing the image area of the target object, the alignment parameter of the target object may be determined when the image area of the target object is segmented from each of video frames. The alignment parameter may be a position coordinate of the target object in the original video frame or a relative position coordinate relative to a reference frame.

In the examples of the present disclosure, the alignment parameter may be carried in the data of the image area of target object in each video frame, and the position may be determined according to the alignment parameter when the image fusion is performed, so that the image area of the target object is accurately overlaid on the background frame.

In some examples, the operation that the alignment parameter is determined according to the position of the target object in each of the video frames includes the following operations:

a video frame is selected from the video frames in the video as a reference frame; and the alignment parameter is determined according to a position offset of the target object in each of the video frames relative to the target object in the reference frame.

In examples of the present disclosure, a video frame may be used as the reference frame for determining the above-mentioned alignment parameters. For example, the first frame in which the video starts to play or starts to record is used as a reference frame, the position where the target object is located is recognized, and the position coordinate of the target object in the entire picture is stored.

When each subsequent video frame is processed to generate the special effect frames, the above-mentioned alignment parameter may be determined according to the position offset of the target object in each of the video frames relative to the target object in the reference frame.

In examples of the present disclosure, when video frames are processed, position parameters may be determined according to the reference frame in the video, rather than according to coordinates in the video frame itself. That is, the relative position relationship is used instead of the absolute position in the whole video picture, so that the position deviation due to the picture jitter and the like may be reduced, thereby making the picture of the special effect frames more smooth. In this way, even if the user shoots directly with the handheld terminal, some jitter will not affect the picture effect of the special effect frames, and there is no need to use a fixed tool such as a tripod to fix the terminal.

In some examples, the method further includes the following operations:

a posture of the target object in each of the video frames is determined;

a video frame in which the posture of the target object is detected as a first predetermined posture is determined to be the start frame; and a video frame in which the posture of the target object is detected as a second predetermined posture is determined to be the end frame.

Here, the start frame and the end frame are the first special effect frame and the last special effect frame with the static special effect in the video. In the process of automatically generating the special effect frames, the start frame and the end frame may be automatically determined according to the recognition of the predetermined posture.

In examples of the present disclosure, the point in time to enter the static special effect may be determined according to the posture of the target object. For example, the target object is a person, and when it is detected that the posture of the person is a first predetermined posture such as lifting a hand, nodding, snapping a finger, or a facial expression being a smile, it is determined that the current frame is the start frame. That is, the posture of the target object in each video frame is detected, if the similarity between a posture and the first predetermined posture is high, the posture of the target object may be considered as the first predetermined posture. The first frame in which the posture of the target object is detected as the first predetermined posture may be determined to be the start frame with the static special effect. For each of video frames after the start frame, the corresponding special effect frame is generated according to the fusion of the image area of the target object and the background frame.

The above first predetermined posture is a predetermined posture for triggering the entry into the time static mode. When the first predetermined posture is detected, subsequent video frames may be automatically processed to generate the special effect frames. A prompt message may also be output to prompt the user whether or not to trigger the generation of the special effect frames, or to prompt the user to automatically generate the special effect frames subsequently. Then, the generated special effect frames may be displayed on the preview interface, so that the user may preview the effect of the generated special effect frames.

The above second predetermined posture may be the same posture as the first predetermined posture, or may be a different posture. In a case that the second predetermined posture is the same posture as the first predetermined posture, such as raising a hand, during video playback, if the original video frames are playing and the posture of the target object is detected as raising a hand, it will be switched to play special effect frames with the static special effect; if the special effect frames are playing and the posture of the target object is detected as raising a hand, it will be switched to play the original video frame. Accordingly, if the second predetermined posture is different from the first predetermined posture, it is unnecessary to determine whether the video frame currently being played is the special effect frame. The special effect frame or the original video frame to be played subsequently may be determined directly according to the posture of the target object.

It should be noted that the above-described method of determining the start frame and the end frame for the static special effect by detecting the posture of the target object may be performed during the process of video recording or during the process of view recording and previewing concurrently. For example, during the process of recording, the camera component of the terminal acquires the shot video frame at a certain frequency, and selects the background frame in advance before the static special effect is entered.

If it is detected that the posture of the target object in the currently acquired video frame matches with the first predetermined posture, in each the subsequent video frames, the image area of the target object is sequentially fused to the background frame to generate the special effect frame, and the special effect frame is displayed on the display screen in real time for the photographer to preview. If it is detected that the posture of the target object in the currently acquired video frame matches with the second predetermined posture, the captured video frames are directly displayed on the display screen in the subsequent previewing process.

Of course, the above-described method of determining the start frame and the end frame may be implemented in the process of processing the recorded video in which a user may modify the recorded video and add a special effect, or may be implemented during the process of recording the video in which a special effect may be added at any time, so that more diversified video effects may be implemented and user experience may be improved.

The examples of the present disclosure also provide the following examples.

In the examples of the present disclosure, through the static special effect, the subject photographed performs a gesture control operation to stop the objects surrounding the subject photographed from moving, so as to generating the feelings of static time, and then the special effect may be stopped through a gesture of the subject to resume the felling of time passing.

The examples of the present disclosure use artificial intelligence technology and video image segmentation technology to automatically recognize an subject in a video and an area where the subject is located and to recognize different postures such as gestures, actions, or facial expressions of the subject. And the video special effect may be directly previewed during the process of recording the video by the terminal, and a video with a special effect may be generated in real time. For example, a video with special effect is directly photographed or produced by a mobile phone without the need for professionals to use post-production video editing tools, and the operation is simple. In addition, jitter and angle variations in the process of shooting may be automatically corrected by algorithms.

Figure 4:
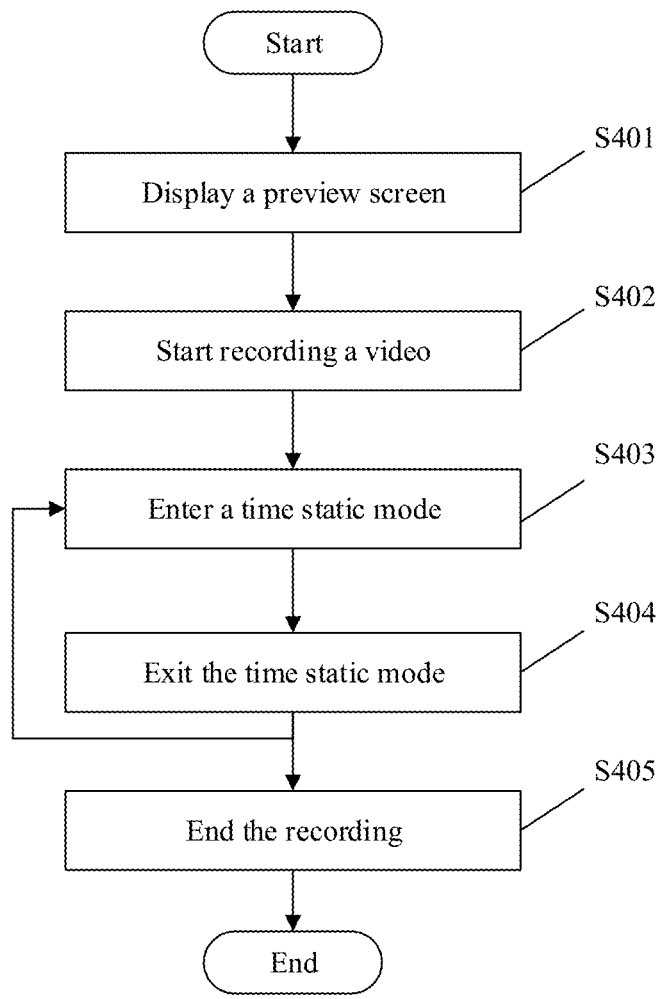
FIG. 4 is a flowchart of recording a video with a static special effect according to an example of the present disclosure.

The process of recording a video and previewing the static special effect by a terminal may be implemented by the operations shown in FIG. 4.

In operation S401, the camera is turned on and the preview state is entered to display a preview picture.

In operation S402, recording a video is started when an operation instruction for starting recording is received.

In operation S403, a time static mode is entered according to a user instruction or a posture of the target object in a recorded video picture.

In operation S404, the time static mode is exited according to the user instruction or the posture of the target object in the recorded video picture to resume the display of the captured picture as a preview picture.

In operation S405, the recording is ended according to the operation instruction and at least one of the video with the special effect frames or the original video is stored.

After entering the above recording state, the shooting parameters, including ISO, exposure time, focusing distance, white balance parameters, and the like, may be locked first. The recorded first frame is then used as a reference frame, and an alignment module is generated according to the reference frame. The alignment module uses the position coordinates of the target object in the reference frame as the reference coordinates. Thus, when the alignment parameter of the target object in each of the other video frames is determined, the position of the target object relative to the reference coordinates may be determined according to the alignment module, so that the position of the target object may be determined.

During the process of the recording, a buffer space may also be created for buffering video frames that need to generate special effect frames.

For each frame in the video, the position and posture of the target object are determined by technologies such as character shape recognition, edge recognition, and the like, and the alignment parameter may then be determined using the above-mentioned alignment module.

In addition, the video encoder may also be created, and video frames to be displayed (special effect frames in the case of the time static mode) may be transmitted to the video encoder to facilitate encoding processing to generate a final video file.

After the time static mode is entered, the first frame after the time static mode is entered may be used as a background frame. A currently processed or currently displayed video frame is added to the buffer space to facilitate the generation of a special effect frame. When the number of video frames stored exceeds the size limit of the buffer space, the real-time production and preview of the time static mode may be automatically exited, and the video recording may be continued. Of course, if it is necessary to produce special effect frames for subsequent video frames, the video frames may be re-processed after the recording is finished. Therefore, it does not occupy excessive buffer space.

When the special effect frame is generated, the image area where the target object is located in the currently processed video frame may be drawn onto the background frame according to the alignment parameter, and the edges is feathered to form the special effect frame which is then outputted to the above-mentioned encoder.

By detecting the posture of the target object, it is determined whether to enter the time static mode or exit the time static mode. If the time static mode is exited, the recorded video content continues to be displayed.

When the recorded video is processed, the earliest frame in the buffered frames may be used as a background frame, and then image segmentation is performed on the video frame to be processed and the area where the target object is located is segmented and drawn onto the background frame, and the image area where the target object is located is appropriately enlarged and feathered, so that the image area is better fused into the background image to form a smoother picture.

According to the above technical solutions of the examples of the present disclosure, the image segmentation technology, the motion recognition technology and the image alignment technology for the video may be used to automate the traditional artificial video special effect editing work, and optimize the special effect editing at the mobile terminal, so that the terminal may shoot the video in real time while producing and previewing the special effect video, which is convenient for users to perform the two-way adjustment to the shooting content and the processing of the video special effect, so as to obtain better video effects and improve the user experience.

Figure 5:
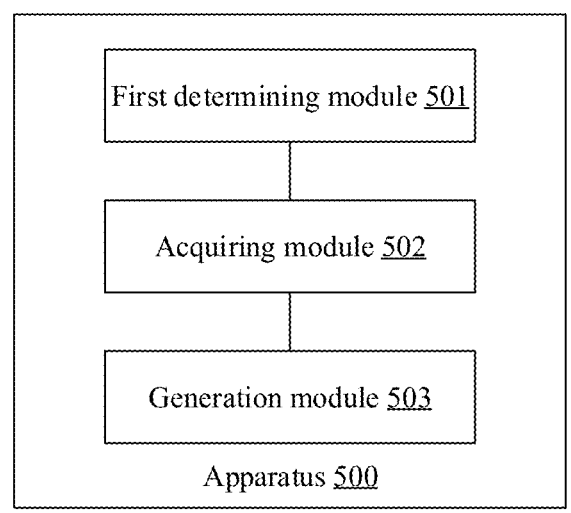
FIG. 5 is a structural block diagram of a video processing apparatus according to an example of the present disclosure.

FIG. 5 is a structural block diagram of a video processing apparatus shown according to an example of the present disclosure. As shown in FIG. 5, the apparatus 500 is applied to a terminal, and includes a first determining module 501, an acquiring module 502 and a generation module 503.

The first determining module 501 is configured to select, from video frames in a video to be processed, a background frame for a static special effect.

The acquiring module 502 is configured to: for each of the video frames in the video, acquire an image area, where a target object is located, from the respective video frame.

The generation module 503 is configured to fuse the image area into the background frame, to generate a special effect frame with the static special effect.

In some examples, the generation module is specifically configured to:

for each of video frames starting from a start frame in the video, fuse the image area, which is acquired from the respective video frame, into the background frame, to generate the special effect frame with the static special effect; or, for each of video frames between the start frame and an end frame in the video, fuse the image area, which is acquired from the respective video frame, into the background frame, to generate the special effect frame with the static special effect.

In some examples, the apparatus further includes a display module, a buffering unit and a generation unit.

The display module is configured to display the video frames in the video when being recorded.

A buffering unit is configured to: in response to a number of video frames in a predetermined storage space not exceeding a storage amount threshold, buffer the video frames starting from the start frame.

A generation unit is configured to fuse the image area, which is acquired from each of the buffered video frames, into the background frame to generate and display the special effect frame.

In some examples, the first determining module includes a determining sub-module.

The determining sub-module is configured to determine a first frame after the video to be processed enters a time static mode in which the static special effect is formed, as the background frame for the static special effect.

In some examples, the generation module includes an overlaying sub-module and a processing sub-module.

The overlaying sub-module is configured to overlay an area at a target position in the background frame with the image area.

The processing sub-module is configured to feather edges of the image area with which the background frame was overlaid to form the special effect frame.

In some examples, the overlaying sub-module includes a determining unit and an overlaying unit.

The determining unit is configured to determine an alignment parameter according to the position of the target object in each of the video frames.

The overlaying unit is configured to overlay, according to the alignment parameter, the area at the target position in the background frame with the image area of the target object.

In some examples, the determining unit is specifically configured to:

select a video frame from the video frames in the video as a reference frame; and determine the alignment parameter according to a position offset of the target object in the each of the video frames relative to the target object in the reference frame.

In some examples, the apparatus further includes a detection module, a second determining module and a third determining module.

The detection module is configured to detect a posture of the target object in each of the video frames.

The second determining module is configured to determine a video frame in which the posture of the target object is detected as a first predetermined posture to be the start frame.

The third determining module is configured to determine a video frame in which the posture of the target object is detected as a second predetermined posture to be the end frame.

With regard to the apparatus in the above examples, the specific manner in which the various modules perform operations has been described in detail in the examples relating to the method, and will not be described in detail herein.

The technical solutions provided in the examples of the present disclosure may include the following beneficial effects. According to the technical solutions in the examples of the present disclosure, video processing is performed by a terminal to implement the static special effect by fusing some areas of different video frames images, which is convenient for the terminal device to perform the recognition of target objects and the image fusion automatically. Therefore, the special effect frames can be generated intelligently without requiring complicated video processing tools and post-production techniques.

Figure 6:
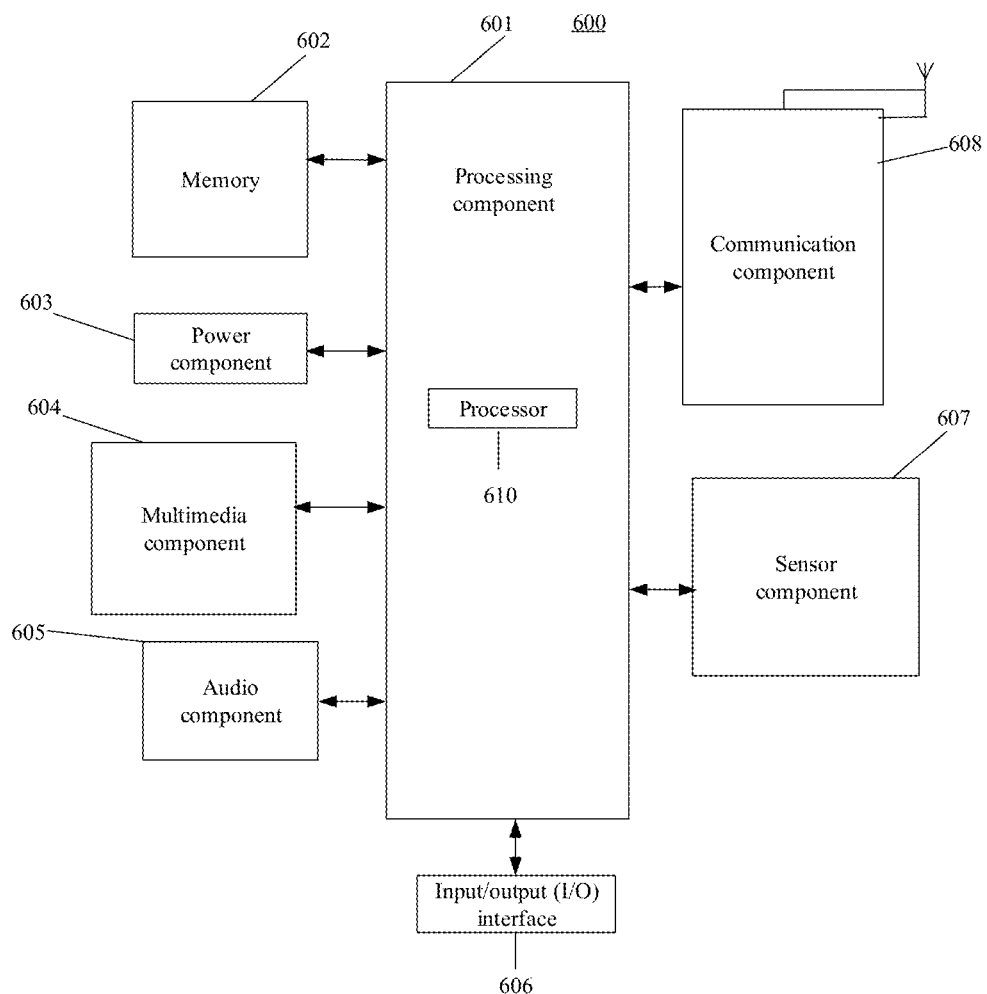
FIG. 6 is an entity structural block diagram of a terminal according to an example of the present disclosure.

FIG. 6 is a block diagram of a terminal 600 according to an example of the present disclosure. For example, the terminal 600 may be a mobile phone, a computer, a digital broadcast terminal, a messaging device, a game console, a tablet device, a medical device, an exercise device, a personal digital assistant, or the like.

Referring to FIG. 6, a terminal 600 may include one or more of a processing component 601, a memory 602, a power component 603, a multimedia component 604, an audio component 605, an input/output (I/O) interface 606, a sensor component 607, and a communication component 608.

The processing component 601 generally controls the overall operation of the terminal 600, such as operations associated with displays, telephone calls, data communications, camera operations, and recording operations. The processing component 601 may include one or more processors 610 to execute instructions to perform all or a part of the operations of the above method. In addition, processing component 601 may also include one or more modules to facilitate interaction between processing component 601 and other components. For example, processing component 601 may include a multimedia module to facilitate interaction between multimedia component 604 and processing component 601.

The memory 602 is configured to store various types of data to support operation at the terminal 600. Examples of such data include instructions for any application or method operating on the terminal 600, contact data, phone book data, messages, pictures, video, etc. Memory 602 may be implemented by any type of volatile or non-volatile storage device or combination thereof, such as static random access memory (SRAM), electrically erasable programmable read only memory (EEPROM), erasable programmable read only memory (EPROM), programmable read only memory (PROM), read only memory (ROM), magnetic memory, flash memory, magnetic disk, or optical disk.

The power component 603 provides power to various components of the terminal 600. The power component 603 may include a power management system, one or more power supplies, and other components associated with generating, managing, and distributing power for the terminal 600.

The multimedia component 604 includes a screen that provides an output interface between the terminal 600 and a user. In some examples, the screen may include a liquid crystal display (LCD) and a touch panel (TP). If the screen includes a touch panel, the screen may be implemented as a touch screen to receive input signals from a user. The touch panel includes one or more touch sensors to sense gestures on the touch, slide, and touch panel. The touch sensor may not only sense the boundary of a touch or sliding action, but also detect the duration and pressure associated with the touch or sliding operation. In some examples, the multimedia component 604 includes a front-facing camera and/or a rear-facing camera. When the terminal 600 is in an operation mode, such as a shooting mode or a video mode, the front-facing camera and/or the rear-facing camera may receive external multimedia data. Each front and/or rear camera may be a fixed optical lens system or have a focal length and optical zoom capability.

The Audio component 605 is configured to output and/or input audio signals. For example, the audio component 605 includes a microphone (MIC) configured to receive an external audio signal when the terminal 600 is in an operating mode, such as a call mode, a recording mode, and a speech recognition mode. The received audio signal may be further stored in memory 610 or transmitted via the communication component 608. In some examples, the audio component 605 further includes a speaker for outputting the audio signal.

The I/O interface 606 provides an interface between the processing component 601 and a peripheral interface module, which may be a keyboard, a click wheel, a button, or the like. These buttons may include, but are not limited to, a home page button, a volume button, an activation button, and a lock button.

The sensor component 607 includes one or more sensors for providing a status assessment of various aspects to the terminal 600. For example, the sensor component 607 may detect the on/off state of the terminal 600, the relative positioning of the components, such as the display and keypad of the terminal 600, the sensor assembly 607 may also detect changes in the position of the terminal 600 or one of the components of the terminal 600, the presence or absence of user contact with the terminal 600, the orientation or acceleration/deceleration of the terminal 600, and changes in the temperature of the terminal 600. The sensor component 607 may include a proximity sensor configured to detect the presence of a nearby object in the absence of any physical contact. The sensor component 607 may also include a light sensor, such as a Complementary Metal Oxide Semiconductor (CMOS) or Charge-Coupled Device (CCD) image sensor, for use in imaging applications. In some examples, the sensor component 607 may also include an acceleration sensor, a gyroscope sensor, a magnetic sensor, a pressure sensor, or a temperature sensor.

The communication component 608 is configured to facilitate wired or wireless communication between the terminal 600 and other devices. The terminal 600 may access a wireless network based on a communication standard, such as WiFi, 2G, or 3G, or a combination thereof. In one example, the communication component 608 receives broadcast signals or broadcast-related information from an external broadcast management system via a broadcast channel. In one example, the communication component 608 further includes a near field communication (NFC) module to facilitate short-range communication. For example, the NFC module may be implemented based on radio frequency identification (RFID) technology, infrared data association (IrDA) technology, ultra wide band (UWB) technology, Bluetooth (BT) technology, or other technologies.

In examples, the terminal 600 may be implemented by one or more application specific integrated circuits (ASICs), digital signal processors (DSPs), digital signal processing devices (DSPD), programmable logic devices (PLDs), field programmable gate arrays (FPGAs), controllers, microcontrollers, microprocessors, or other electronic components for performing the above methods.

In examples, a non-transitory computer-readable storage medium including instructions, such as the memory 602 including instructions executable by the processor 610 of a terminal 600 to perform the above-described method, is also provided. For example, the non-transitory computer-readable storage medium may be a ROM, a random access memory (RAM), a CD-ROM, a magnetic tape, a floppy disk, an optical data storage device, or the like.

The examples of the present disclosure also provide a non-transitory computer readable storage medium, instructions in the storage medium, when being executed by a processor of a mobile terminal, cause the mobile terminal to perform the method provided in any of the above examples.

Other examples of the invention will readily occur to those skilled in the art upon consideration of the specification and practice of the disclosure disclosed herein. This disclosure is intended to cover any variations, uses, or adaptive of the present disclosure. These variations, uses, or adaptive changes follow the general principles of the present disclosure and include common general knowledge or conventional technical means in the technical field, which are not disclosed in the present disclosure. The specification and the examples are considered as being exemplary only.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

It should be understood that the present disclosure is not limited to the exact construction that has been described above and illustrated in the accompanying drawings, and that various modifications and changes may be made without departing from the scope thereof.

The invention claimed is:

1. A video processing method, implemented by a terminal, the method comprising:
   selecting, from video frames in a video to be processed, a background frame for a static special effect; and
   for each of the video frames in the video, acquiring an image area, where a target object is located, from the respective video frame, and fusing the image area into the background frame, to generate a special effect frame with the static special effect,
   wherein selecting, from the video frames in the video to be processed, the background frame for the static special effect comprises:
   determining a first frame after the video to be processed enters a time static mode in which the static special effect is formed, as the background frame for the static special effect.

2. The method of claim 1, wherein fusing the image area into the background frame, to generate the special effect frame with the static special effect comprises:
   for each of video frames starting from a start frame in the video, fusing the image area, which is acquired from the respective video frame, into the background frame, to generate the special effect frame with the static special effect; or,
   for each of video frames between a start frame and an end frame in the video, fusing the image area, which is acquired from the respective video frame, into the background frame, to generate the special effect frame with the static special effect.

3. The method of claim 2, further comprising:
   displaying the video frames in the video when being recorded;
   in response to a number of video frames in a predetermined storage space not exceeding a storage amount threshold, buffering the video frames starting from the start frame; and
   fusing the image area, which is acquired from each of the buffered video frames, into the background frame to generate and display the special effect frame.

4. The method of claim 2, further comprising:
   detecting a posture of the target object in each of the video frames;
   determining a video frame, in which the posture of the target object is detected as a first predetermined posture, to be the start frame; and
   determining a video frame, in which the posture of the target object is detected as a second predetermined posture, to be the end frame.

5. The method of claim 1, wherein fusing the image area into the background frame to generate the special effect frame with the static special effect comprises:
   overlaying an area at a target position in the background frame with the image area; and
   feathering edges of the image area with which the background frame was overlaid to form the special effect frame.

6. The method of claim 5, wherein overlaying the area at the target position in the background frame with the image area comprises:
   determining an alignment parameter according to the position of the target object in each of the video frames; and
   overlaying, according to the alignment parameter, the area at the target position in the background frame with the image area of the target object.

7. The method of claim 6, wherein determining the alignment parameter according to the position of the target object in each of the video frames comprises:
   selecting a video frame from the video frames in the video as a reference frame; and
   determining the alignment parameter according to a position offset of the target object in the video frame relative to the target object in the reference frame.

8. A terminal, comprising:
a processor; and
a memory for storing executable instructions executable by the processor,
wherein the processor is arranged to:
select, from video frames in a video to be processed, a background frame for a static special effect; and
for each of the video frames in the video, acquire, through a multimedia component, an image area, where a target object is located, from the respective video frame and fuse the image area into the background frame, to generate a special effect frame with the static special effect,
wherein the processor is further arranged to:
determine a first frame after the video to be processed enters a time static mode in which the static special effect is formed, as the background frame for the static special effect.

9. The terminal of claim 8, wherein the processor is further arranged to:
for each of video frames starting from a start frame in the video, fuse the image area, which is acquired from the respective video frame, into the background frame, to generate the special effect frame with the static special effect; or,
for each of video frames between a start frame and an end frame in the video, fuse the image area, which is acquired from the respective video frame, into the background frame, to generate the special effect frame with the static special effect.

10. The terminal of claim 9, wherein the processor is further arranged to:
display, through the multimedia component, the video frames in the video when being recorded;
in response to a number of video frames in a predetermined storage space not exceeding a storage amount threshold, buffer the video frames starting from the start frame; and
fuse the image area, which is acquired from each of the buffered video frames, into the background frame to generate and display the special effect frame.

11. The terminal of claim 9, wherein the processor is further arranged to:
detect a posture of the target object in each of the video frames;
determine a video frame, in which the posture of the target object is detected as a first predetermined posture, to be the start frame; and
determine a video frame, in which the posture of the target object is detected as a second predetermined posture, to be the end frame.

12. The terminal of claim 8, wherein the processor is further arranged to:
overlay an area at a target position in the background frame with the image area; and
feather edges of the image area with which the background frame was overlaid to form the special effect frame.

13. The terminal of claim 12, wherein the processor is further arranged to:
determine an alignment parameter according to the position of the target object in each of the video frames; and
overlay, according to the alignment parameter, the area at the target position in the background frame with the image area of the target object.

14. The terminal of claim 13, wherein the processor is further arranged to:
select a video frame from the video frames in the video as a reference frame; and
determine the alignment parameter according to a position offset of the target object in the video frame relative to the target object in the reference frame.

15. A non-transitory computer readable storage medium having computer executable instructions stored thereon, the computer executable instructions, when being executed by a processor, cause the processor to implement:
selecting, from video frames in a video to be processed, a background frame for a static special effect; and
for each of the video frames in the video, acquiring an image area, where a target object is located, from the respective video frame, and fusing the image area into the background frame, to generate a special effect frame with the static special effect,
wherein selecting, from the video frames in the video to be processed, the background frame for the static special effect comprises:
determining a first frame after the video to be processed enters a time static mode in which the static special effect is formed, as the background frame for the static special effect.

* * * * *